United States Patent [19]

Myers

[11] 3,860,686

[45] Jan. 14, 1975

[54] METHOD OF AND APPARATUS FOR EXTRUDING PLASTIC MATERIALS

[75] Inventor: Daryl Lester Myers, Lawrenceville, Ga.

[73] Assignee: Western Electric Company, Incorporated, New York, N.Y.

[22] Filed: Nov. 3, 1972

[21] Appl. No.: 303,435

Related U.S. Application Data

[63] Continuation-in-part of Ser. No. 260,584, June 7, 1972, abandoned.

[52] U.S. Cl. ............... 264/174, 264/176 R, 425/113
[51] Int. Cl. .................................................. B29f 3/10
[58] Field of Search ................ 264/174, 176 R, 209; 425/113

[56] References Cited
UNITED STATES PATENTS

| | | | |
|---|---|---|---|
| 2,893,056 | 7/1959 | Henning | 425/113 |
| 3,227,786 | 1/1966 | Cohen | 264/174 |
| 3,737,260 | 6/1973 | Kaye | 425/113 |

*Primary Examiner*—Robert F. White
*Assistant Examiner*—T. E. Balhoff
*Attorney, Agent, or Firm*—A. C. Schwarz, Jr.

[57] ABSTRACT

Flow conditions in an extrusion head in a cross head type extrusion apparatus for applying a concentric plastic insulating covering uniformly around a longitudinally advancing filamentary core advancing axially through a die concentrically disposed in an extrusion chamber in the head, are improved by providing channeled tooling within the chamber which bends and divides an initial stream of plastic material forced into the chamber into a plurality of equal streams which combine symmetrically around the core. With respect to certain channels, the ratio of the length of the channel to its effective cross-sectional diameter exceeds a predetermined critical number to achieve the development of steady state fluid flow therein.

Additionally, whenever a stream of plastic material is divided subsequent to a bend before steady flow can develop therein, the division is made symmetrically with respect to the principal plane of the preceding bend to ensure identical pressure and velocity profiles in each of the divided streams.

7 Claims, 12 Drawing Figures

PATENTED JAN 14 1975

FIG. 12

METHOD OF AND APPARATUS FOR EXTRUDING PLASTIC MATERIALS

CROSS-REFERENCE TO RELATED APPLICATION

This is a continuation-in-part of application Ser. No. 260,584, filed June 7, 1972, now abandoned.

BACKGROUND OF THE INVENTION

1. Field of the Invention

The present invention relates to a method of extruding plastic materials, and more particularly, to a method of extruding uniform coverings of plastic insulating materials upon continuously advancing filamentary cores, which may be, for example, electrical conductor wires.

2. Technical Considerations and Prior Art

In the manufacture of communications wire and cable, insulating plastic coverings are extruded over a filamentary core, such as a wire or a cable core, by extrusion apparatus of the cross head type, which includes an extrusion cylinder having a stock screw rotatably mounted within a cylindrical bore therein for forcing an extrudable plastic compound from an entrance end of the bore to a delivery end thereof. The filamentary core is advanced through an extrusion head mounted at the delivery end of the bore and formed with an extrusion chamber or passage extending transversely across and communicating with the extrusion bore, for receiving a stream of plastic compound in a viscous fluent state. A forming die, concentric with and positioned in an exit end of the extrusion chamber, is positioned in axial alignment with and spaced from a core tube or guide positioned in the chamber, which passes and guides the advancing core through the axial center of an extrusion orifice in the die.

Extrusion apparatus of the foregoing type necessitates that the stream of fluent plastic material undergo at least one 90° bend in its flow path, producing flow imbalance conditions in the plastic compound characterized by differences in flow rates and fluid pressures in those portions of the extrusion head proximate to and remote from the delivery end of the extrusion bore. These flow imbalances are a frequent cause of eccentricity, or lack of concentricity, between the plastic insulating sheath and the core of the extruded product and/or out-of-roundness of the outer circumference of the plastic insulating sheath. This results in cross-sectional and longitudinal variations in the wall thickness of the covering on the core. Such variations are virtually intolerable in insulated wire conductors utilized for electrical communications, since the electrical characteristics thereof must be substantially uniform. Therefore, the concentricity, roundness and uniformity of the insulating covering must be stringently controlled.

The foregoing inherent unbalanced flow conditions within a cross head type plastic insulation extruder are magnified when the plastic insulating material extruded onto the filamentary core is of a highly viscous or highly elastic type, for example, polypropylene.

Various methods and apparatuses have been devised in an attempt to solve the problem of flow imbalance in cross head extruders with varying degrees of success. These have included, among other things, dividing the stream of plastic material delivered to the chamber into a plurality of smaller streams which are subsequently recombined around the forward end of the core tube adjacent to the die, in an attempt to equalize the flow of plastic onto the core at circumferentially spaced points therearound. This was done on a volumetric or flow rate basis, neglecting the pressure and velocity distribution in the plastic streams, to attempt to obtain an equal quantity of plastic material in each stream combining around the filamentary core.

While many prior art flow balancing techniques have resulted in the production of an extruded product having improved concentricity of the insulating sheath relative to the core and improved roundness of the product, they have been found to be unsatisfactory when the plastic material utilized is of the highly viscous or highly elastic type. A stream of highly viscous fluid, such as molten polypropylene, when moving through a conduit or closed channel, is subjected to shear stresses which result in substantial velocity and pressure gradients, particularly in and subsequent to a curve or bend in the channel, before steady state fluid flow has been established in the stream. It is therefore imperative that these gradients be taken into consideration when the fluid stream in the channel is further divided into smaller streams in order to assure that the velocity and pressure gradients in each of the smaller streams is identical. Otherwise each smaller stream will not deliver an equal quantity of plastic to the core and the plastic covering formed thereon will not be uniform therearound and may be eccentric with respect thereto.

SUMMARY OF THE INVENTION

One object of the present invention is to provide new and improved methods of extruding plastic materials.

Another object of the present invention is to provide new and improved methods of extruding uniform coverings of highly viscous or highly elastic plastic materials upon continuously advancing filamentary cores.

Another object of the present invention is to provide a new and improved method of extruding a uniform covering of plastic material upon a continuously advancing filamentary core, wherein a stream of plastic is divided into a plurality of smaller streams such that each smaller stream is provided with substantially identical pressure and velocity gradients to impinge on the core at equal circumferentially spaced points with respect thereto.

Another object of the present invention is to provide a new and improved method of extruding a uniform covering of plastic material upon a continuously advancing filamentary core wherein the flow of the plastic material is substantially lengthened in order to achieve steady state flow characteristics, by providing relatively inexpensive modifications to existing types of extrusion apparatus.

A method of extruding a plastic covering upon a filamentary core advancing through an extrusion chamber and an extrusion die, in accordance with the present invention, may include forcing a stream of molten plastic compound into the chamber transversely of the advancing core, bending the stream of plastic to flow in the direction of and parallel to the path of the advancing core at a first predetermined radial distance therefrom, dividing the bent stream into a first plurality of distinct streams circumferentially spaced around and parallel to the core at the first predetermined radial distance therefrom, directing the first plurality of streams radially inward toward the core, dividing each of the radially directed streams of plastic material into a second plurality of distinct streams circumferentially spaced around the core at a second lesser radial distance therefrom and assembling the last divided streams at the die circumferentially around the core.

BRIEF DESCRIPTION OF THE DRAWINGS

A more complete understanding of the invention will be obtained from the following detailed description of a preferred embodiment and four exemplary alternative embodiments thereof when read in conjunction with the accompanying drawings, wherein.

DETAILED DESCRIPTION

Figure 1:
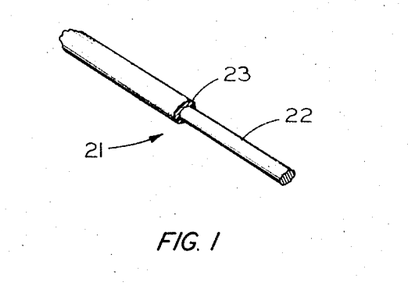
FIG. 1 is a perspective view of an insulated electrical conductor consisting of a conductive filamentary core, for example, a copper wire, having a uniform sheath or covering of plastic insulating material thereon.

Referring to FIG. 1, an insulated wire conductor 21 includes a conductive filamentary core 22 covered with a uniform sheath of tubular plastic insulating material 23. The core 22 may be, for example, a copper or aluminum wire having a diameter which may range between approximately 0.016 and 0.045 inches and the insulating sheath 23 may be formed of, for example, polypropylene, having a wall thickness which may range between approximately, 0.008 and 0.022 inches, respectively.

Figure 2:
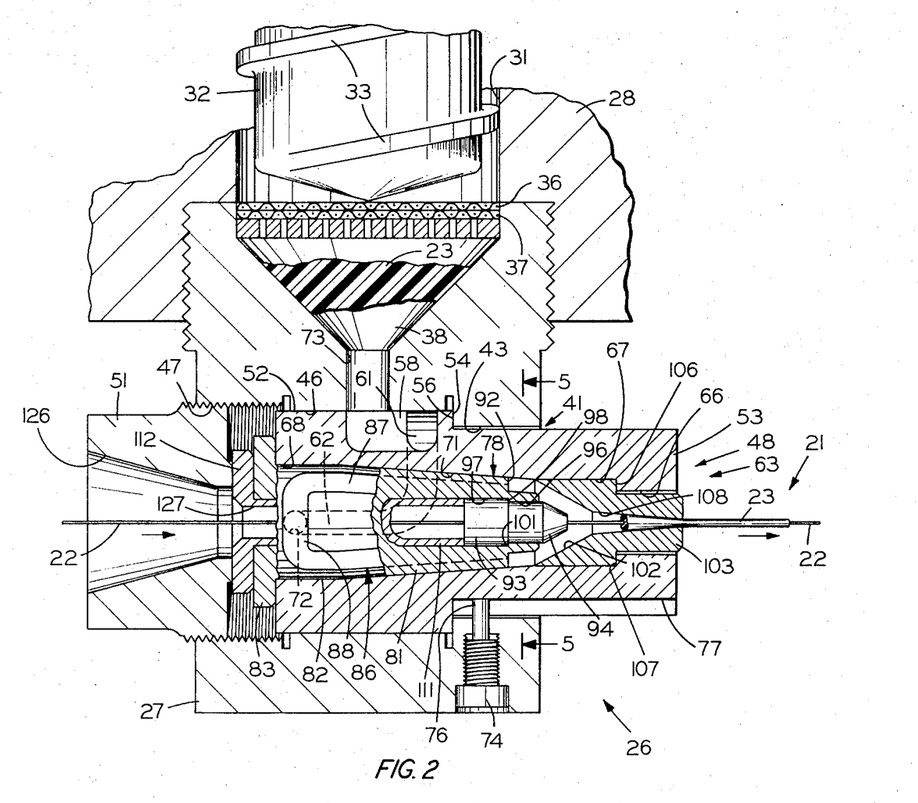
FIG. 2 is a fragmentary, horizontal sectional view of a cross head type extrusion apparatus, illustrating certain features of the invention, for applying the plastic insulating sheath to the filamentary core of FIG. 1.

The plastic sheath 23 is typically extruded upon the filamentary core 22 as the latter is advanced longitudinally by a suitable strand advancing means, such as a capstan (not shown), through a cross head type extrusion apparatus 26, as shown in FIG. 2, in which molten plastic 23 is applied to the core 22 in an extrusion head 27.

Referring to FIG. 2, the extrusion apparatus 26 includes an extrusion cylinder 28 formed with a centrally located, elongated, cylindrical extrusion bore 31, having a stock screw 32 mounted for rotation about a longitudinal axis therein by suitable drive means (not shown). Helical threads 33—33 formed on the stock screw 32 work and advance the plastic insulating material 23 along the extrusion bore 31 to a delivery end thereof through a straining screen 36 and an apertured backing plate 37 adjacently aligned at the mouth of an infundibular opening 38 formed in the extrusion head 27. The extrusion head 27 is threaded into the extrusion cylinder 28 with the opening 38 coaxially aligned with the extrusion bore 31 to form a continuation thereof. The opening 38 communicates with an axial extrusion passageway 41 formed in the extrusion head 27 in orthagonal relationship to the extrusion bore 31.

The foregoing described components of the extrusion apparatus 26 are well-known in the art and are included for a proper understanding of the remainder of the apparatus.

It has been determined that, notwithstanding the various improvements in extrusion tooling, i.e., the components of the extrusion apparatus in the extrusion head that guide the core and direct and apply the plastic material delivered to the extrusion head around the core, eccentricity and out-of-roundness of the extruded product remain pronounced problems when the plastic material is highly viscous or highly elastic, i.e., able to recover easily from a deformation produced therein.

It has been determined that if the flow of the plastic material in the extruder head is lengthened, the material has a longer time to damp out any disturbances therein and achieve steady state flow conditions before it contacts the advancing core. It has been discovered that steady state flow of a viscous fluid in a confined channel will be achieved if the fluid is permitted to flow for a distance in the channel which bears a predetermined relationship to the effective diameter of the stream of fluid. It has been discovered also that if a stream of highly viscous or highly elastic fluent plastic material is divided into small streams circumferentially spaced equally around an advancing filamentary core to impinge thereon, a superior product will be obtained if the division is carried out such that the pressure and velocity gradients in the small streams are identical and are symmetrical with respect to the core.

The extrusion tooling hereinafter described is designed to utilize the foregoing discoveries to advantage with many types of existing cross head extruders, requiring little or no modification to the components thereof thus far described and being relatively inexpensive.

As shown in FIG. 2, the passageway 41 includes a bore 43, a counterbore 46 and a tapped section 47 coaxial therewith. A generally cylindrical tool holder or capsule 48 is removably retained in the passageway 41 in the head 27 by a retainer plug 51 threaded into the tapped section 47 thereof. The cylindrical capsule 48 includes an enlarged portion 52 having a smaller portion 53 extending coaxially therefrom. A shoulder 54 on the capsule 48 engages a step 56 in the passageway 41.

Figure 3:
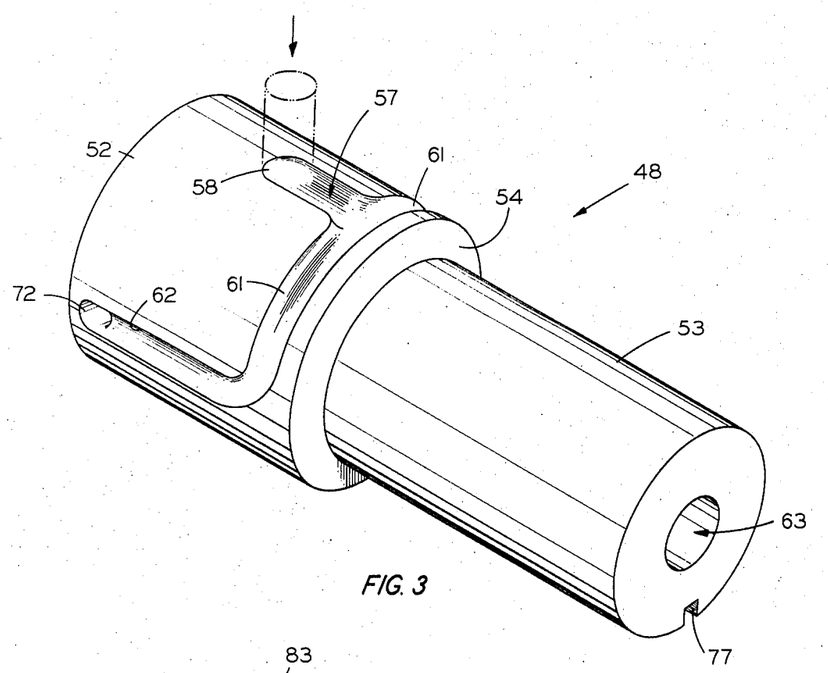
FIG. 3 is a perspective view of a tool holder or capsule, forming part of the apparatus shown in FIG. 2, particularly illustrating an E-shaped flow channel formed in the peripheral surface thereof for dividing a stream of plastic material into a plurality of smaller streams.

As shown in FIGS. 2 and 3, the periphery of the enlarged cylindrical portion 52 of the capsule 48 is formed with an E-shaped channel 57 including a longitudinal central channel leg or groove 58 which communicates with a pair of contiguous circumferential channel legs 61—61 transversely aligned therewith. A pair of outer longitudinal channel legs 62—62 extend from the extremities of the channel legs 61—61. The central leg 58 and the outer legs 62—62 are mutually parallel and are parallel to a longitudinal central axis through the capsule 48. The distal ends of the outer legs 62—62 extend beyond the proximal end of the central leg 58. The legs 62—62 are approximately twice the length of the central leg 58 and are disposed on diametrically opposite sides of the enlarged portion 52 of the capsule 48. The E-shaped channel 57 is symmetrical about a plane through the longitudinal central axis of the capsule 48 and bisecting the central channel leg 58. While the legs of the E-shaped channel 57 are shown preferably as being substantially semicircular in cross-section, they may have various cross-sectional configurations, e.g., V-shaped, rectangular, etc.

The capsule 48 is provided with a longitudinal opening 63 axially therethrough which includes a bore 66 and a counterbore 67 formed in the smaller portion 53 and a larger bore 68 formed in the enlarged portion 52 thereof. The bore 68 communicates with the counterbore 67 through an aligned tapered opening 71. Additionally, a radial bore 72 is formed in the distal end of each outer channel leg 62 on diametrically opposed sides of the capsule 48. Each radial bore 72 communicates with the bore 68 of the opening 63 in capsule 48.

The capsule 48 is aligned axially in the passageway 41 with the proximal end of the central channel leg 58 forming a continuation of a cylindrical feed port 73 at the end of the opening 38 in the head 27. The alignment of the capsule 48 is maintained by a socket head set screw 74, threaded into the head 27, having a lug 76 thereon extending into a longitudinal slot 77 formed in the smaller portion 53 of the capsule 48.

Figure 4:
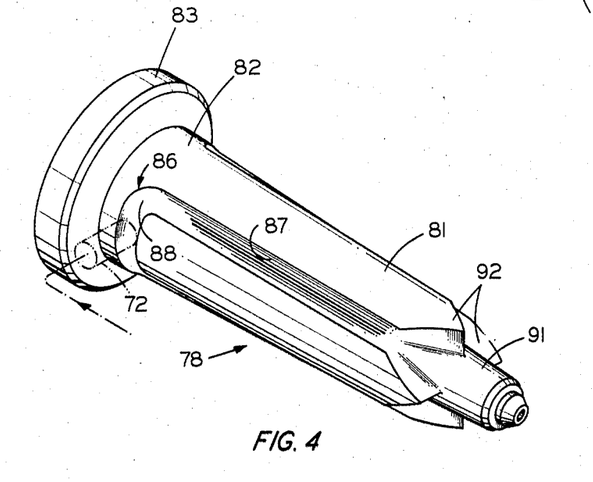
FIG. 4 is a perspective view of a core tube holder, forming part of the apparatus of FIG. 2, particularly illustrating one of a pair of diametrically opposed U-shaped channels or grooves formed in the peripheral surface, and converging at the tip, thereof.
Figure 5:
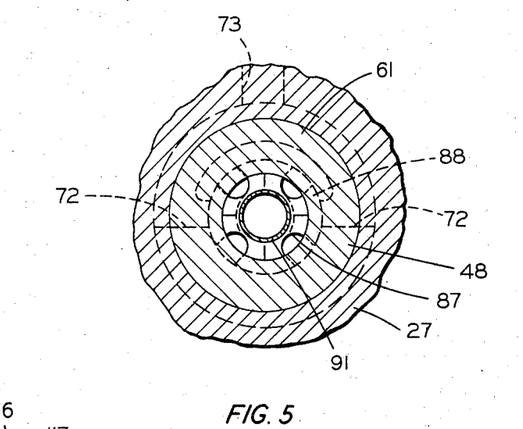
FIG. 5 is a sectional view of the apparatus of FIG. 2, taken along the lines 5—5 thereof.

Referring to FIGS. 2 and 4, a core tube holder 78, includes a generally frustoconical body 81 extending from a cylindrical member 82 having a flange 83 formed thereon. The holder 78 is removably fitted closely within the longitudinal opening 63 formed in the capsule 48 with the cylindrical member 82 and the body 81 aligned with the bore 68 and the tapered opening 71, respectively, therein.

The outer periphery of the core tube holder 78 is formed with a pair of diametrically opposed, U-shaped channels 86—86, each of which includes a pair of longitudinal channel legs 87—87 connected by an arcuate circumferential channel leg 88. The radial bores 72—72 in the capsule 48 are aligned and communicate transversely with the central portions of the arcuate legs 88—88. The longitudinal channel legs 87—87 are substantially parallel at the portions thereof formed on the cylindrical member 82, and converge towards the forward end of the holder 78, parallel to the conical periphery of the body 81, flaring out to form a frustoconical confluence 91, extending from a plurality of beveled land portions 92—92 defined between adjacent spaced legs 87—87. The bevel angle of the land portions is approximately 45°, terminating approximately three-tenths of an inch from the end of the confluence 91 on the core tube holder 78. The legs 87—87 are spaced equally about the axis of the core tube holder 78 at angular distances of 90°.

A cylindrical core tube 93 of the well-known type having an axial passage (not shown) for guiding a filamentary core therethrough and having a frustoconical end 94 which converges at a conical angle of approximately 60°, is removably retained within a bore 96 and a counterbore 97 formed axially in the core tube holder 78, with a shoulder 98 formed on the core tube 93 engaging a step 101 defined between the bore 96 and the counterbore 97. The end 94 of the core tube 93 projects from the end of the core tube holder 78 into a frustoconical entrance orifice 102 formed in a cylindrical die 103, removably retained within the bore 66 and the counterbore 67 of the opening 63 in the capsule 48, with a shoulder 106 on the die 103 engaging a step 107 formed between the bore 66 and the counterbore 67 of the capsule 48. The entrance orifice 102 of the die 103 converges at a conical angle of approximately 60° and communicates coaxially with a frustoconical throat 108, which converges at an angle of approximately 5°. The throat 108 may be approximately twice the axial length of the entrance 102 of the die 103. A core tube retainer 111, having a flange 112 formed thereon, positions the core tube 93 at the forward end of the holder 78. In addition to securing the capsule 48 in place, the retainer plug 51 also serves to retain the core tube holder 78 and the core tube retainer 111 in place within the capsule 48.

Figure 6:
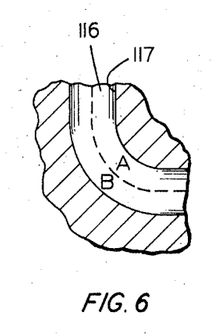
FIG. 6 is a schematic illustration representing a stream of fluent material flowing in a confined channel having a 90° bend therein.

Referring to FIG. 6, there is shown a schematic illustration of the curved flow of a stream of incompressible fluid 116 in a confined channel or conduit 117 having a bend formed therein. The pressure and velocity gradients of the stream 116 in the vicinity of the bend are simplified by considering the curved stream 116 as comprising two contiguous parallel curved half-streams, designated "A" and "B," the division therebetween being indicated by a dotted line bisecting the stream 116. For purposes of explanation, let it be assumed that half-stream "A" has an average pressure $P_a$ and an average velocity $V_a$ and that the half-stream "B" has an average pressure $P_b$ and an average velocity $V_b$. Due to the curved flow of the stream 116 around the bend, illustrated as being approximately 90°, and according to well-known principles of fluid mechanics, the average pressure and average velocity between the half-streams "A" and "B" will differ in the bend and for some distance therebeyond, until the shear forces in the stream are balanced and a steady state flow established. This difference becomes more pronounced for fluids of increased viscosity or elasticity.

If the stream 116 is separated or divided into two equal streams before a steady state flow thereof can be achieved, i.e., flow in a straight path in a confined channel for a time sufficient to allow the fluid to recover from the transient gradients therein produced by the bend in channel 117, the pressure and velocity gradients in the streams resulting from the division can be identical only if the each stream resulting from the division includes equal parts of the half-streams "A" and "B." This principle is utilized in the present invention whenever a stream of plastic is divided into smaller streams subsequent to a bend in a channel in which the stream flows.

Figure 7:
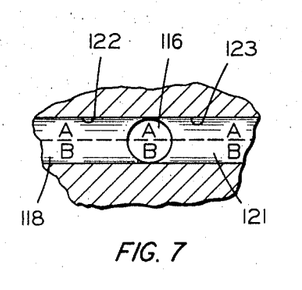
FIG. 7 is a schematic illustration representing the stream of FIG. 6 being divided into two streams a short distance after having undergone the 90° bend of FIG. 6.

As an example of the foregoing, consider the schematic illustration of FIG. 7, which shows the stream 116 of FIG. 6 being divided equally into two streams 118 and 121 in opposite directions in a pair of aligned channels 122 and 123, respectively, transverse to the flow, immediately following the bend in channel 117 and before the fluid has had time to achieve a steady state flow. It has been discovered that plastic material flowing in a confined channel will achieve steady state charateristics if the ratio of the length of the channel to its effective cross-sectional diameter (hereinafter referred to as the $L$ to $D$ ratio) equals or exceeds a predetermined number. For polyethylene and polyvinyl chloride this number has been empirically found to range between 5 and 10. It will be assumed here that the division of stream 116 occurs before the fluid has traveled a distance sufficient to exceed its L to D ratio.

As shown in FIG. 7, each stream 118 and 121 includes equal parts of half-streams "A" and "B," therefore the pressure and velocity gradients in streams 118 and 121 are not merely volumetrically identical but have identical pressure and velocity profiles. This will be true if the division occurs symmetrically with respect to the principal plane of the bend. It has been found that if such identical streams are combined symmetrically around a filamentary core, the resulting insulated conductor will have a uniform tubular sheath with improved roundness and improved concentricity with respect to the filamentary core.

Figure 8:
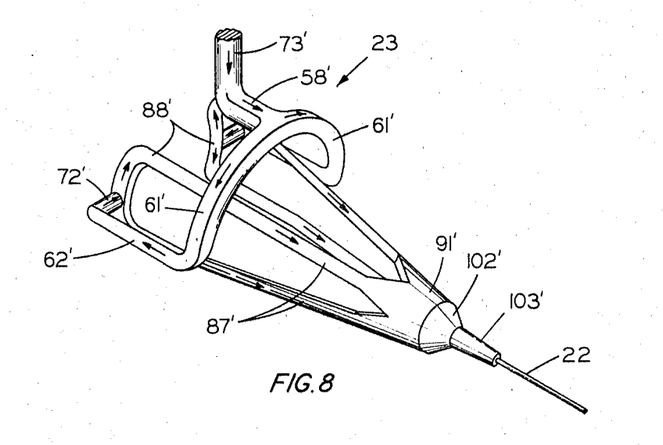
FIG. 8 is a perspective view of a column or stream of plastic insulating compound and the manner in which it is divided, balanced and reassembled the apparatus of the invention, particularly by the capsule of FIG. 3 and the core tube holder of FIG. 4.

FIG. 8 illustrates the flow of plastic material 23 in the extruder head 27. The various sections of the plastic material have been provided with reference numerals corresponding to the component of the apparatus in, over or through which the plastic material flows, with a prime (') following the reference numeral. It will be seen that the principles relating to steady state flow and stream separation set forth in the foregoing description relating to FIGS. 6 and 7 are applied, with the result that a plurality of identical streams of plastic material are combined at the forward end of the core tube holder 78, symmetrically about the filamentary core 22 in order to provide a uniform covering therearound.

Operation

In the operation of the extrusion apparatus 26, the filamentary core 22 is advanced at a predetermined speed axially through the chamber 41 in the head 27, passing through a flared opening 126 in the retainer plug 51, an axial passageway 127 in the core tube retainer 111, and axially through the core tube 93 and the die 103. The plastic material 23, in a molten or viscous fluid state, is forced from the delivery end of the bore 31 through the screen 36 and the apertured backing plate 37 into the opening 38 through the cylindrical feed port 73 and into the proximal end of the longitudinal central channel leg 58 of the E-shaped channel 57 formed in the periphery of the capsule 48. The flow of plastic material 23 in the channel 57 is confined therein by the counterbore 46 of the passageway 41.

The primary stream 73' of plastic material 23 from the feed port 73 undergoes a 90° bend at the proximal end of the channel leg 58, thereafter flowing parallel to the direction of the advancing filamentary core 22 at a first radial distance (approximately 1 inch) therefrom. Then the plastic material 23 is divided transversely, symmetrically with respect to the principal plane of the bend defined by stream 73' and stream 58' into a pair of equal oppositely directed symmetrical circumferential streams 61'—61' in the channel legs 61—61. Each stream 61' undergoes another 90° bend, flowing in the outer, diametrically opposed channel legs 62—62, in two equal streams 62'—62', parallel with and opposite to the direction of the advancing filamentary core 22 and the exit end of the extrusion chamber 41. The plastic material thereafter undergoes another 90° bend, flowing inward through the radial bores 72—72 in the capsule 48 and is divided again transversely, symmetrically with respect to the principal plane of the bends defined by streams 62'—62' and 72'— 72', into equal, oppositely directed, circumferential streams 88'—88' in the channel legs 88—88 formed in the core tube holder 78 at a second radial distance (approximately 0.5 inches) from the advancing core.

The four streams 88'—88' thereafter bend and converge toward the confluence 91 on the core tube holder 78, as four identical streams 87'—87', flowing in the longitudinal channel legs 87-87, formed therein. The plastic material 23 in the channel legs 87—87 and 88—88 is confined therein by the tapered opening 71 formed in the capsule 48 and the larger bore 68 therein, respectively.

The four streams 87'—87' converge at equally spaced points circumferentially around the confluence 91, combining and flowing over the frustoconical tip 94 of the core tube 93 into an annular extrusion orifice defined between the tip 94 and the entrance 102 of the die 103, entering the throat 108 therein, to form a uniform tubular insulating sheath 23 around the filamentary core 22 as the plastic material exits the die 103 as a finished insulated conductor 21.

Referring again to FIG. 8, the streams 61'-61', 62'—62', and 87'—87' are long enough with respect to their effective cross-sectional diameters to permit the plastic material 23 to establish steady state flow characteristics. This occurs because each channel leg 61, 62 and 87 has an $L$ to $D$ ratio in excess of the critical number for the plastic material to be utilized. For example, if the confined channel formed by an outer channel leg 61 of the capsule 48 and the counterbore 46 in the head 27 has an effective cross-sectional diameter of 0.25 inches, a channel length of 2.5 inches will insure that steady state flow conditions will be present in the plastic material entering the associated radial bore 72, if the plastic material is polypropylene or polyethylene. This, together with the principles of balanced division of the streams subsequent to a bend thereof, set forth above, make the extrusion apparatus highly desirable to utilize with highly viscous or highly elastic plastic materials.

The cross-sections of the channel legs formed in the various components of the apparatus are preferably smaller following a division of a stream therein. For example, in the E-shaped channel 57 formed on capsule 48, the central channel leg 58 may be larger in cross-section than either of the circumferential channel legs 61—61 or either of the outer longitudinal channel legs 62—62. Similarly, each of the bores 72—72 may have larger cross-sectional areas than each of the channel legs 86—86 and 87—87 formed in the periphery of the core tube holder 78.

Alternative Embodiments

Four exemplary alternative embodiments of extrusion tooling for a cross head type extrusion apparatus in accordance with the principles of the invention are illustrated in FIGS. 9, 10, 11 and 12.

Figure 9:
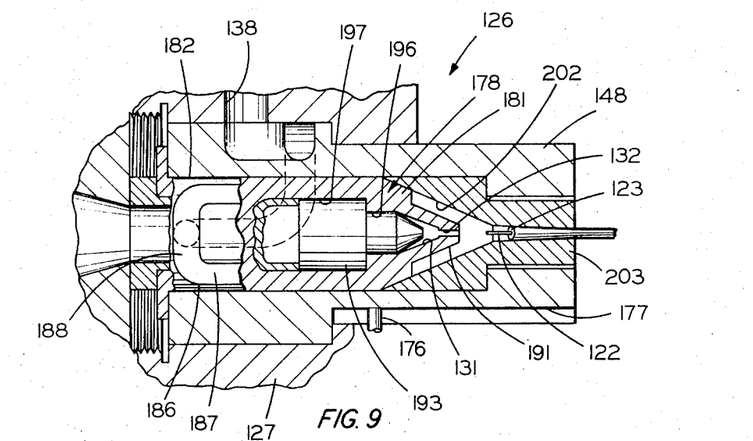
FIGS. 9, 10, 11 and 12 illustrate alternative embodiments of the apparatus of FIG. 2.

Referring to FIG. 9, a core tube holder 178 which completely encloses a core tube 193 is removably positioned within a capsule 148. The core tube holder 178 includes a frustoconical tip 181 extending from a cylindrical body 182. The tip 181 is provided with a frustoconical confluence 191 extending therefrom. The tip 181 and the confluence 191 converge at an angle of 45° with the tip 181 being, for a short distance, contiguous with a 45° converging entrance orifice 202 of a die 203. The core tube 193 is retained within an axial bore 196 and a counterbore 197 formed in the core tube holder 178. A tapered bore 131 having a guide bore 132 coaxially extending therefrom communicates and is coaxially aligned with the bore 196 in the core tube holder 178. The bore 132 provides an additional guide means for a filamentary core 122 passing axially through the core tube 193 and the die 203.

A pair of diametrically opposed U-shaped channels 186—186, each including a pair of spaced, parallel longitudinal channel legs 187—187 connected by a circumferential channel leg 188, are formed in the periphery of the core tube holder 178. The channel legs 187—187 terminate at the confluence 191 to deliver four equally spaced, balance streams of plastic material between confluence 191 and the entrance orifice 202 of the die 203 to impinge upon the core 122.

Figure 10:
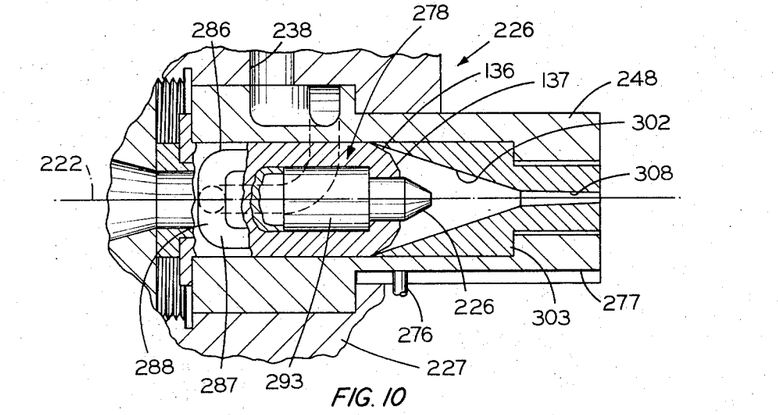

The arrangement of FIG. 10 is similar to FIG. 9, having a core tube holder 278 which is similar to the core tube holder 178 of FIG. 9 modified to expose, rather than enclose a frustoconical tip 226 formed on a core tube 293, removably positioned therein, by eliminating the confluence 191 and machining the tip 181 to form a pair of successively converging frustoconical portions 136 and 137 respectively, the latter terminating just behind the tip 226 on the core tube 293. The embodiment of FIG. 10 increases the volume of plastic material at the entrance orifice 302 of a die 303, which may be longer than the die 203 of FIG. 9.

Figure 11:
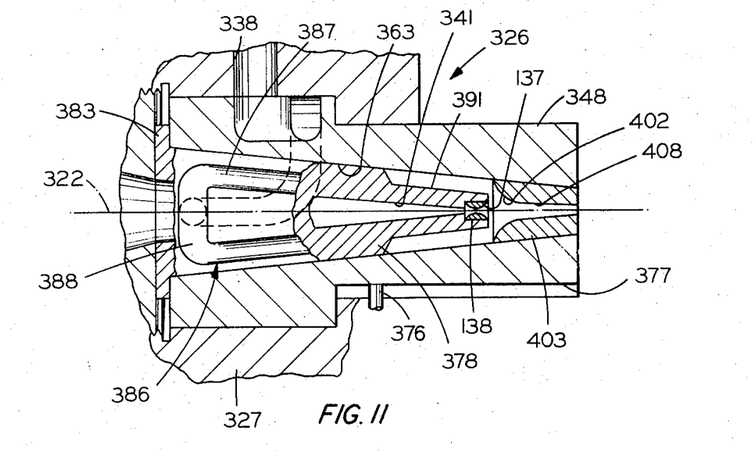

FIG. 11 shows capsule 348 formed with a tapered bore 363 for removably receiving a frustoconical die 403 and a coaxially aligned, generally frustoconical core tube 378 having a flange 383 formed thereon. The die 403 and the core tube 378 are coaxially aligned, having identical converging angles, for example, approximately 15°. The core tube 378 is designed to perform the functions of the combination of a conventional core tube and the channeled core tube holder or adapter 78, 178 and 278 of FIGS. 2, 9 and 10, respectively.

The core tube 378 is formed with a tapered passageway 341 therethrough which terminates in a cylindrical land 137 for receiving a bored diamond die 138 therein for guiding a filamentary core 322 therethrough. A pair of diametrically opposed U-shaped channels 386—386 each including a pair of converging longitudinal channel legs 387—387 connected by a circumferential channel leg 388 at their diverging ends, are formed on the core tube 376. The channel legs 387—387 terminate at a reduced frustoconical confluence 391 of the core tube 378. The plastic material flows in the channel legs 387—387, confined therein by the bore 363 of the capsule 348, into the space between the confluence 391 and the bore 363, flowing over it and into a curved entrance orifice 402 of the die 403 and into a throat 408 thereof to impinge upon the advancing filamentary core 322.

Figure 12:
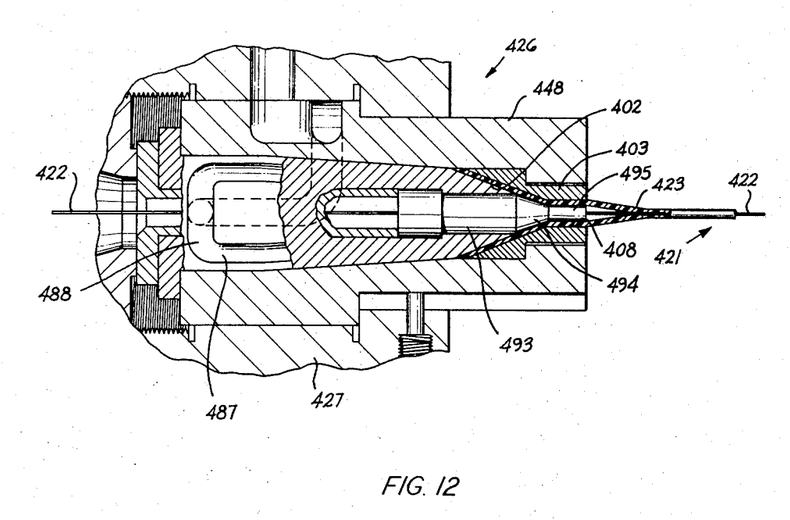

FIG. 12 illustrates a modification of the apparatus of the invention for carrying out tubing type extrusion as distinguished from the pressure type extrusion illustrated in the foregoing embodiments. Tubing type extrusion is well known and may be utilized for wire insulation, but its chief application lies in sheathing or jacketing a cable core or cordage.

As shown in FIG. 12, plastic material 423 is applied around a filamentary core 422 advanced through an extrusion head 427 to form a finished sheathed core 421. The core 422 is passed through a die 403 positioned in a capsule 448 in the head 427, with the plastic material 423 combining and flowing around a tip 494 of a core tube 493 as previously described above. In this embodiment, however, the plastic material 423 is prevented from contacting the core 422 until the latter has exited, or nearly exited the die 403 by providing the core tube 493 with a tubular extension or mandrel 495 extending coaxially from the tip 494 thereof. The extension 495 projects into and through a throat 408 formed in the die 403, the end of the extension 495 being substantially coplanar with the exit end of the die 403 or projecting slightly therebeyond or slightly short with respect thereto. Tubing type extrusion allows sufficient clearance to be provided for cross-sectional variations occurring in the core 422. As the core 422 advances through the head 427, the tubular sheath 423 formed around the mandrel 493 is drawn down around the core 422 to form a sheathed core 421.

The present invention additionally may be utilized advantageously in the extrusion of expanded or cellular plastics onto filamentary cores.

Generally, expanded plastic insulated wire includes a conductive filamentary core having a tubular plastic sheath thereon containing a multiplicity of minute blown cells distributed uniformly throughout the sheath. Expanded insulation may be formed by utilizing a plastic compound mixed with a heat-decomposible expanding or blowing agent such as azodicarbonamide, which decomposes at a controlled temperature, evolving a gas to form cells in the plastic as the sheath issues from the die. Alternatively, plastic compound mixed with a nucleating agent, such as particles of silica, may be introduced into the extrusion chamber 41, where pressurized gas, for example, carbon dioxide, may be injected to cause the nucleable plastic compound to achieve cellular form. Aside from the flow-balancing principles set forth above, inherent in the design of the extrusion apparatus of the invention are the restricted flow back pressure principles taught in U.S. Pat. No. 2,766,481 to G. E. Henning, as being particularly suitable for the extrusion of expanded plastics.

Thus, the invention is not limited to the extrusion of highly viscous or highly elastic plastic insulating material. It may be used for insulating, jacketing or sheathing various types of moving cores with uniform coverings of many types of extrusion grade plastics, including thermoplastic materials, for example, high density polypropylene, low, medium or high density polyethylene, expanded plastics, such as cellular polyethylene or polypropylene, or polyvinyl chloride, and nylon, and thermosetting materials such as rubber or rubber-like compounds of various types, and at substantially higher line speeds, than before possible.

Additionally, it will be appreciated that the grooves or channels formed in the various components of the extrusion tooling set forth may be aligned with corresponding grooves formed in mating parts to enlarge and make the streams of plastic material symmetrical along two cross-sectional coordinate axes. For example, in FIG. 2, the counterbore 46 formed in the chamber 41 may be formed with arcuate grooves aligned with the E-shaped channel 57 such that the plastic streams 58' and 61'—61' (FIG. 8) have circular or elliptical cross-sections. Similarly, the passageway 63 may be formed with internal grooves aligned with and corresponding to the channel legs 87—87 and 88—88 such that the streams 87'—87' and 88'—88' have circular or elliptical cross-sections.

It will also be appreciated that the various embodiments of the invention set forth herein are merely exemplary and other embodiments may be made by those having ordinary skill in the art, without departing from the spirit and scope of the invention, as defined and set forth in the appended claims.

What is claimed is:

1. A method of extruding a plastic covering around a filamentary core advancing sequentially through an extrusion chamber and an extrusion die which comprises the steps of:

forcing a stream of molten plastic compound into the chamber transversely of said advancing core;

bending said stream in the direction of the moving core at a first predetermined radial distance therefrom, dividing said bent stream into a first plurality of distinct streams in paths circumferentially spaced around the core at said first predetermined radial distance therefrom, each of said streams being of a sufficient length with respect to its cross-sectional size to achieve equal and constant pressures and velocities at the extremities thereof;

directing said first plurality of streams radially inward toward said core;

dividing each of said radially directed streams of plastic material into a second plurality of distinct streams circumferentially spaced around the core at a second lesser radial distance therefrom with all of the material of each of said second plurality of distinct streams being moved toward said extrusion die, each of said streams being of a sufficient length with respect to its cross-sectional size to achieve equal and constant pressures and velocities at the extremities thereof; and assembling said last divided streams at said die circumferentially around the core.

2. A method of extruding a plastic covering around a filamentary core, as set forth in claim 1, wherein a substantial part of the flow paths of individual ones of said first plurality of streams is directed parallel and opposite to the direction of said initial stream before the division thereof.

3. A method of extruding a covering of plastic material upon a filamentary core advancing sequentially through an extrusion chamber and an extrusion die which comprises the steps of:

forcing a stream of plastic material in a fluent state into the chamber in a direction normal to the path of the advancing core;

bending said stream of plastic material to flow in the direction of and parallel to the path of the core at a first predetermined radial distance therefrom;

dividing said bent stream into two equal streams transverse to the direction of said bent path and circumferentially at said predetermined first radial distance from said core;

bending each of said equal streams in a direction parallel to and reversed from the direction of said advancing core at said first predetermined radial distance therefrom for a first predetermined longitudinal distance of a sufficient length with respect to its cross-sectional size to achieve equal and constant pressures and velocities at the extremities thereof;

bending each of said equal bent streams radially toward said advancing core;

dividing each of said radially directed streams transversely into a pair of equal streams at a second predetermined radial distance from said core;

bending said divided radial streams to flow toward and in the direction of said advancing core for a second predetermined longitudinal distance of a sufficient length with respect to its cross-sectional size to achieve equal and constant pressures and velocities at the extremities thereof with all of the material of each of said streams which are to flow along said second predetermined longitudinal distance being moved toward said extrusion die; and combining said last bent streams at circumferentially spaced points around the core in the die.

4. A method of extruding a covering of plastic material upon a filamentary core, as set forth in claim 3, wherein the ratio of said first predetermined longitudinal distance to the effective cross-sectional diameter of a reversed stream and the ratio of said second predetermined longitudinal distance to the effective cross-sectional diameter of a divided radial stream is a predetermined number.

5. A method of extruding a covering of plastic material upon a filamentary core, as set forth in claim 4, wherein said predetermined number is at least five.

6. A method of extruding a covering of plastic material upon a filamentary core, as set forth in claim 4, wherein the streams resulting from a dividing step subsequent to a bending step are symmetrical with respect to the principal plane of the bend immediately preceding the dividing step.

7. A method of extruding a covering of plastic material upon a filamentary core, as set forth in claim 3, wherein said combined streams of plastic material are prevented from contacting said core until it has substantially passed through said die.

* * * * *